(12) United States Patent
Tinucci et al.

(10) Patent No.: US 7,394,964 B2
(45) Date of Patent: Jul. 1, 2008

(54) DUST PLUG FOR HARDENED FIBER OPTIC CONNECTOR

(75) Inventors: Thomas Tinucci, Eden Prairie, MN (US); Keith Nelson, Brooklyn Center, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 178 days.

(21) Appl. No.: 11/391,707

(22) Filed: Mar. 28, 2006

(65) Prior Publication Data
US 2007/0031103 A1 Feb. 8, 2007

Related U.S. Application Data

(60) Provisional application No. 60/714,513, filed on Mar. 28, 2005.

(51) Int. Cl.
*G02B 6/00* (2006.01)
(52) U.S. Cl. ............... 385/139; 385/55; 385/75; 385/70; 385/134
(58) Field of Classification Search ............ 385/55, 385/75, 70, 134, 139
See application file for complete search history.

(56) References Cited

U.S. PATENT DOCUMENTS 6,579,014 B2    6/2003  Melton et al.
6,622,356 B2 *  9/2003  Doshi et al. .......... 385/53
6,634,798 B2 * 10/2003  Cheng .................. 385/76
6,648,520 B2   11/2003  McDonald et al.
7,220,062 B2 *  5/2007  Durrant et al. ....... 385/88
2001/0019654 A1  9/2001  Waldron et al.
2003/0063866 A1  4/2003  Melton et al.
2003/0099442 A1 * 5/2003  Cheng .................. 385/76
2005/0041928 A1  2/2005  Zimmel et al.
2006/0269212 A1 * 11/2006 Beck et al. ........... 385/139
2007/0292098 A1 * 12/2007 Kokkinos ............ 385/139

FOREIGN PATENT DOCUMENTS

EP    0 547 778 A1    6/1993

OTHER PUBLICATIONS

Corning Cable Systems LLC, "The OptiTap Connector", 2 pages (Sep. 2005).
Corning Cable Systems LLC, "The OptiTap Hybrid Adapter (OptiTap/SC APC)", 2 pages (Sep. 2005).
International Search Report, mailed Mar. 7, 2006.

* cited by examiner

*Primary Examiner*—Frank G. Font
*Assistant Examiner*—James P. Hughes
(74) *Attorney, Agent, or Firm*—Merchant & Gould P.C.

(57) ABSTRACT

A dust for use with a ruggedized fiber optic connector including a fiber optic adapter. The dust plug provides enhanced sealing for the ruggedized connector when an optical fiber cable is not attached. The dust plug engages the ruggedized connector in a manner similar to a mating fiber connector which may be mounted to a fiber optic cable. The dust plug may include a threaded cap and a keyed insert rotatably mounted to the insert.

9 Claims, 11 Drawing Sheets

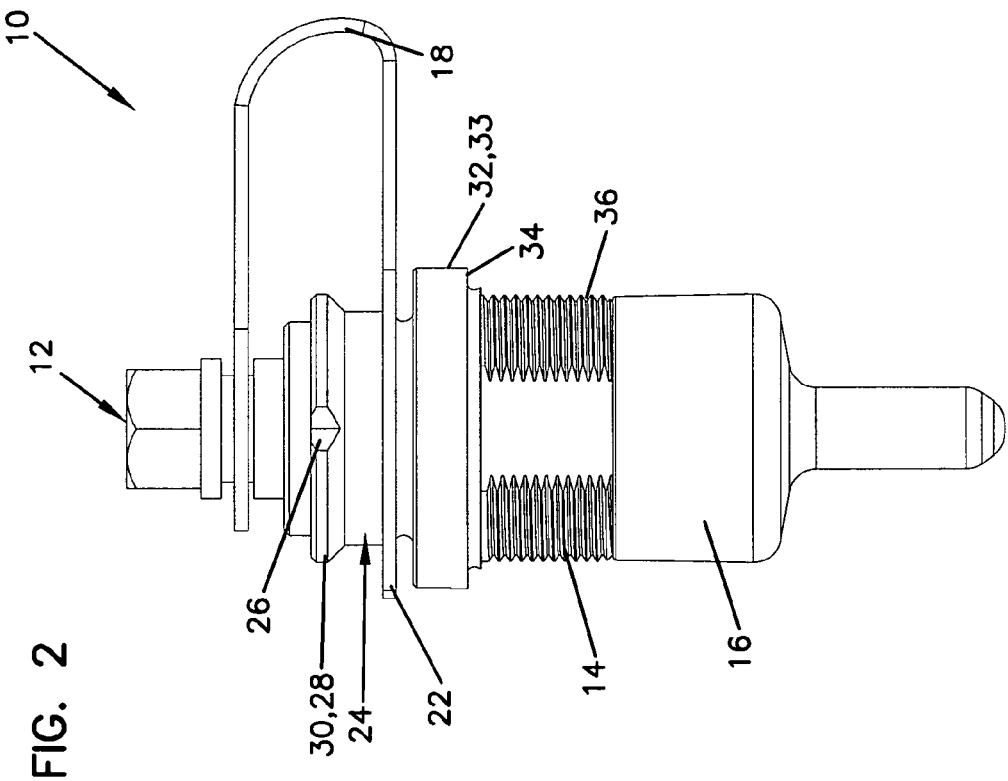
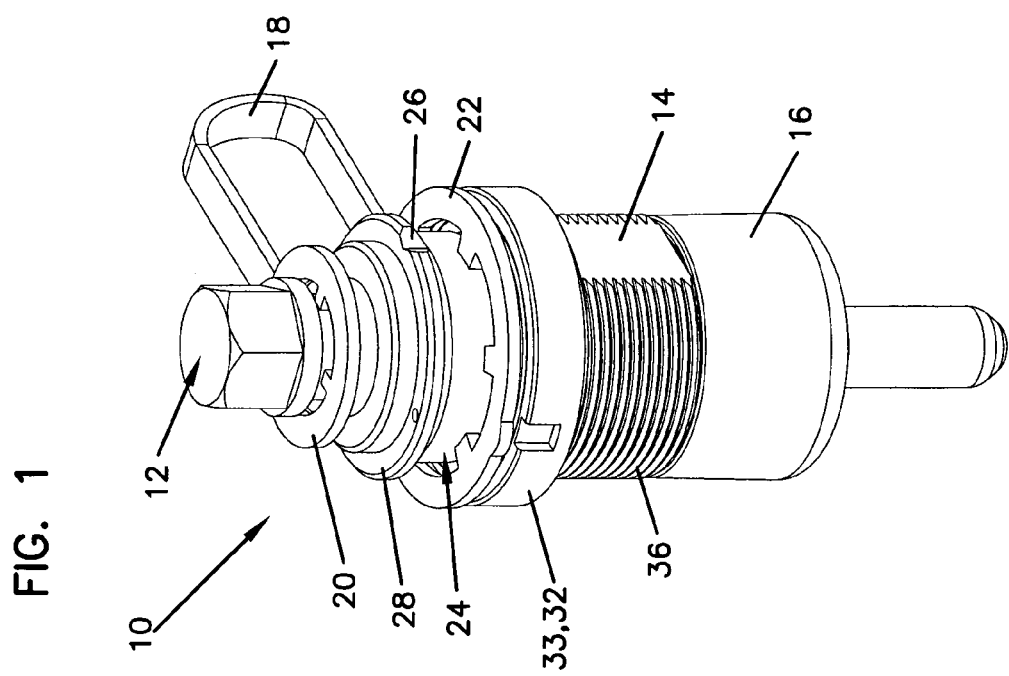

DUST PLUG FOR HARDENED FIBER OPTIC CONNECTOR

RELATED APPLICATION

This application claims benefit of provisional application Ser. No. 60/714,513, filed Mar. 28, 2005, the disclosure of which is incorporated by reference.

BACKGROUND

Hardened or ruggedized fiber optic connector assemblies are known in the telecommunications industry. Such connectors are typically used in locations where an optical fiber connection is desired but which cannot be adequately protected or sealed from environmental exposure. It may be desirable to provide a fairly stable and environmentally sealed surrounding for optical fiber connections to reduce the chance of signal degradation or loss. Sometimes, such hardened connectors may be installed in the field in advance of their being connected to a customer drop or service cable. For these installations, a dust plug may be used to protect the unconnected end of the hardened connector until a customer drop cable is attached. It is desirable that such a dust plug also provide a stable and environmentally sealed surrounding for the unconnected end of the hardened connector.

Corning Cable Systems LLC sells a hardened fiber optic connector known as the OptiTap connector. While the OptiTap connector does provide a stable and environmentally sealed enclosure for optical fiber connections, the known prior art dust plug used with the OptiTap connector may be unable to securely seal an unconnected end of the connector. An improved dust plug which may provide a better level of protection to the unconnected end of a hardened connector is desirable.

SUMMARY

The present invention relates generally to a dust plug for use with a ruggedized fiber optic connector including a fiber optic adapter. More specifically, the dust plug provides enhanced sealing for the ruggedized connector when an optical fiber cable is not attached. The dust plug engages the ruggedized connector in a manner similar to a mating fiber connector which may be mounted to a fiber optic cable. The dust plug may include a threaded cap and a keyed insert rotatably mounted to the cap. The keyed insert may engage keying features of the ruggedized connector and the threaded insert may engage threads of the ruggedized connector to provide a seal.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 1 is a perspective view of a hardened fiber optic connector with an outer dust plug according to the present invention inserted in one end and a dust cap mounted to a second end.

FIG. 2 is a side view of the hardened fiber optic connector with dust plug of FIG. 1.

DETAILED DESCRIPTION

Figure 3:
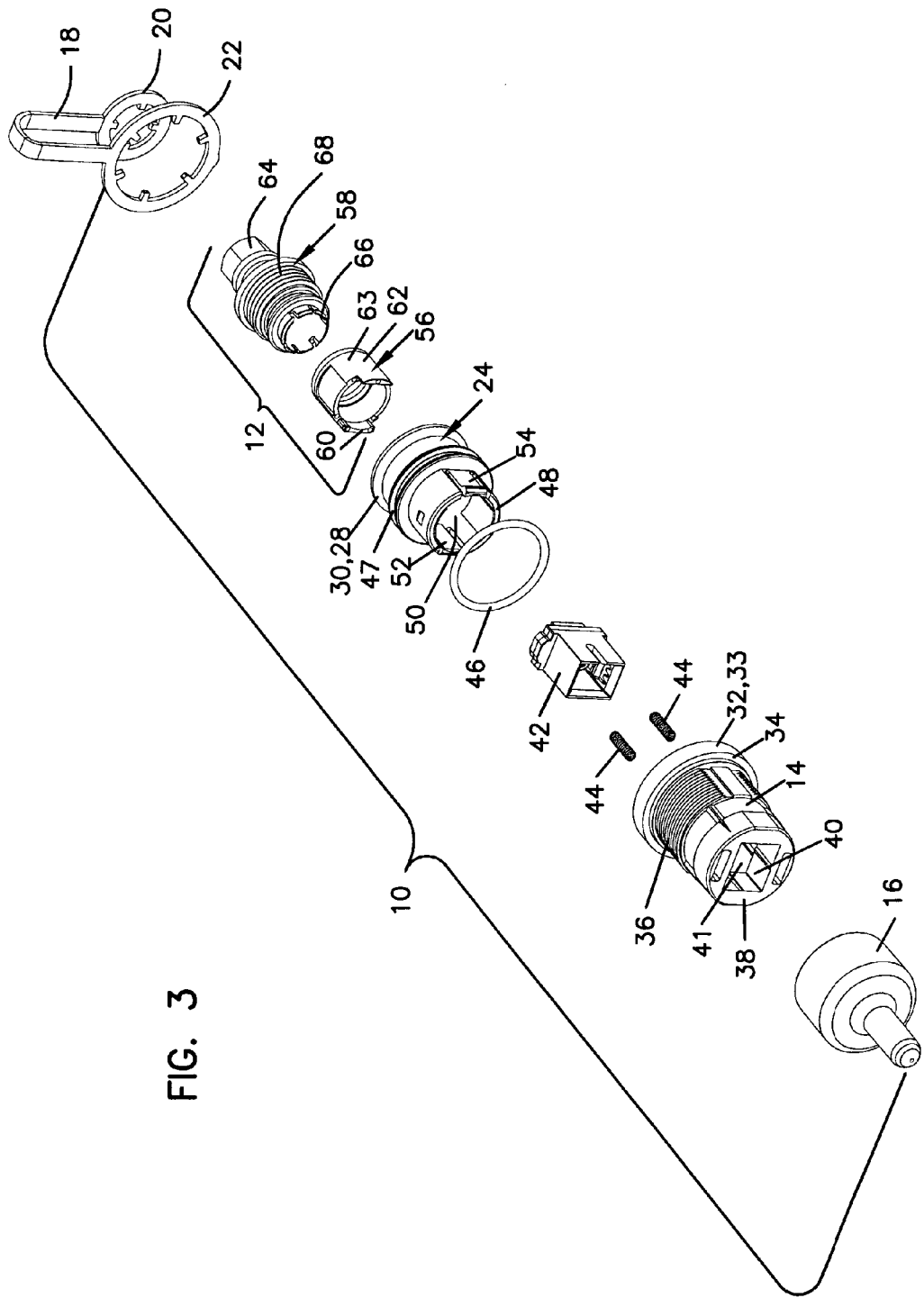
FIG. 3 is an exploded view of the hardened fiber optic connector with dust plug of FIG. 1.

Reference will now be made in detail to exemplary aspects of the present invention which are illustrated in the accompanying drawings. Wherever possible, the same reference numbers will be used throughout the drawings to refer to the same or like parts.

Referring generally to FIGS. 1-18, a dust plug assembly 12 is useable in a fiber optic connector assembly which includes snap together parts. The parts of the fiber optic connector can unsnap. The parts generally stay together when fully connected allowing transmission of fiber optic signals. Prior to full connection, a dust plug can be used to cover a open end of the connector assembly. The parts of the connector assembly can unsnap even when a prior art dust plug is used. The dust plug assembly 12 of the present invention prevents unsnapping of the connector parts, as will be described below.

Corning Cable Systems LLC sells a hardened fiber optic connection system known as the OptiTap connector. Aspects of the OptiTap connector are disclosed in U.S. Pat. Nos. 6,579,014 and 6,648,520, the disclosures of which are incorporated herein by reference. Referring now to FIGS. 1 and 2, a hardened connector assembly 10 includes portions of the prior art OptiTap connector (receptacle) and the novel dust plug assembly 12 that is the subject of the present invention. Assembly 10 includes an adapter housing 14 with an interior dust cap 16 mounted opposite assembly 12. A snap sleeve 24 is inserted within adapter housing 14 and dust plug assembly 12 is inserted within the snap sleeve. A flange 28 is formed at an outer end 30 of snap sleeve 24 and includes a notch 26 to indicate rotational orientation of the snap sleeve.

Figure 18:
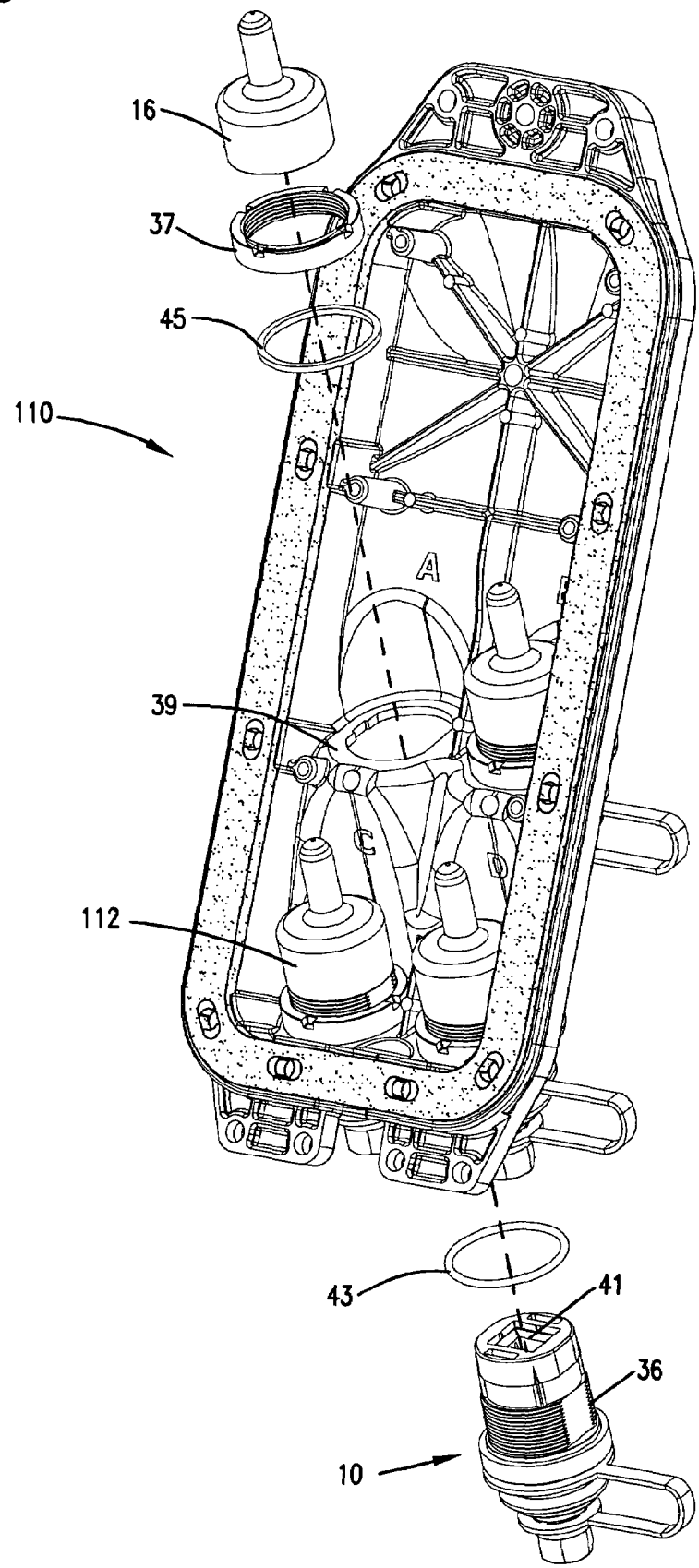
FIG. 18 is a perspective view of a fiber access terminal housing with hardened fiber optic connectors mounted.

A lanyard 18 may be used to connect dust plug assembly 12 to assembly 10 and retain dust plug assembly 12 when it is removed from snap sleeve 24. Lanyard 18 includes a first end 20 through which dust plug assembly 12 is rotatably extended and a second end 22 through which snap sleeve 24 is rotatably extended. A mounting flange 32 at an outer or first end 33 extends circumferentially about adapter housing 14 and provides a surface 34 which may rest against an outer surface of a bulkhead or other mounting location. A threaded portion 36 of adapter housing 14 may extend through the mounting opening and receive a locking ring tightened against an inner surface of the bulkhead or other mounting location to fix adapter sleeve 14 within the mounting opening. Such an installation is shown in FIG. 18. Threaded portion 36 receives a threaded lock ring 37. Bulkhead 39 is positioned between a seal 43, and a support ring 45.

FIG. 3 shows an exploded view of hardened connector assembly 10. Dust cap 16 fits about a second end 38 of adapter housing 14 and covers an opening 40 which extends through adapter housing 14. A fiber optic adapter 42 is positioned within opening 40 and dust cap 16 blocks access to one end of adapter 42. A pair of springs 44 may be included within opening 40 to aid in the positioning and alignment of adapter 42 within opening 40. Adapter 42 may be inserted within opening 40 through first end 33. Once positioned within opening 40, adapter 42 may be held in position by insertion of a second end 48 of snap sleeve 24 into opening 40, also through first end 33. An o-ring 46 may be positioned between snap sleeve 24 and adapter housing 14 to aid in creating a weather tight seal between the two pieces.

Second end 48 of snap sleeve 24 includes a pair of fingers or tabs 52 and 54, which will be described in further detail below. When inserted within opening 40, fingers 52 and 54 may be deflected inwardly and are then sprung back to engage an interior feature within opening 40, such as a ledge or a recess along an inner wall 41. Fingers 52 and 54 are made of a resilient material which will resist inward deflection and provide some force to retain snap sleeve 24 within opening 40. An opening 50 is defined through snap sleeve 24 and is axially aligned with opening 40. When inserted within opening 40, first end 48 may extend to adapter 42 and engage adapter 42 to retain the adapter within opening 40.

Dust plug assembly 12 includes a keyed insert 56 and a threaded portion 58. Threaded portion 58 includes an outer or first end 64 which may include a shape to facilitate grasping or rotation, such as the hexagonal shape shown. Keyed insert 56 is rotatably mounted to a second end 66 of threaded portion 58. Keyed insert 56 includes a first portion 60 and a second opposing portion 62 of an outer surface 63 which are configured to extend within opening 50 and lie adjacent inner walls or surfaces of fingers 52 and 54, respectively. Preferably, first and second portions 60 and 62 are adjacent and close enough to the inner surfaces of fingers 52 and 54 to prevent inward deflection sufficient to disengage the features of inner wall 41. Opening 50 of snap sleeve 24 is threaded adjacent first end 30 to accommodate and mate with a threaded portion 68 on an outer surface 68 of threaded portion 58 between first end 64 and second end 66.

Figure 4:
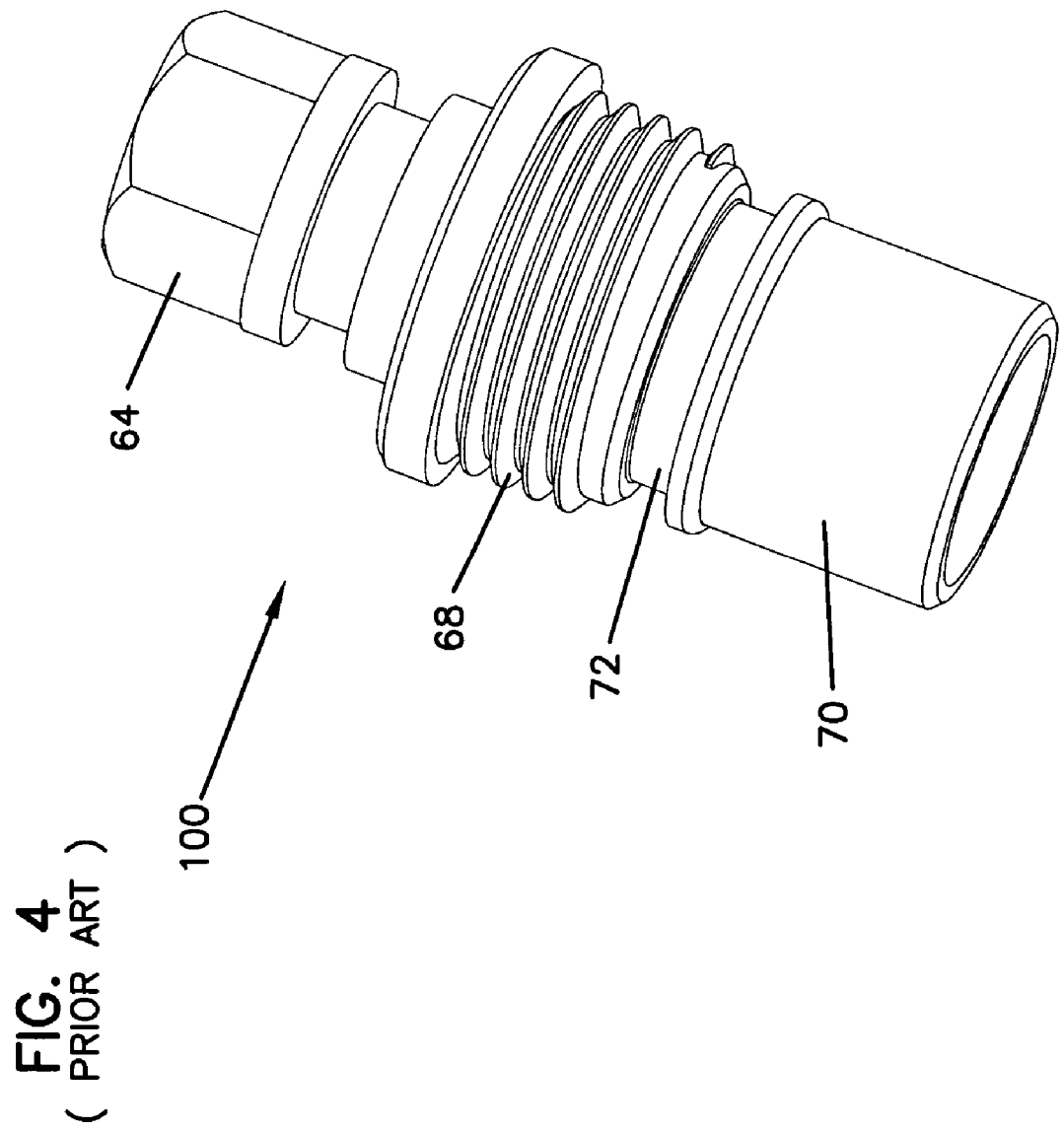
FIG. 4 is a perspective view of a prior art outer dust plug for use with the hardened fiber optic connector of FIG. 1.
Figure 6:
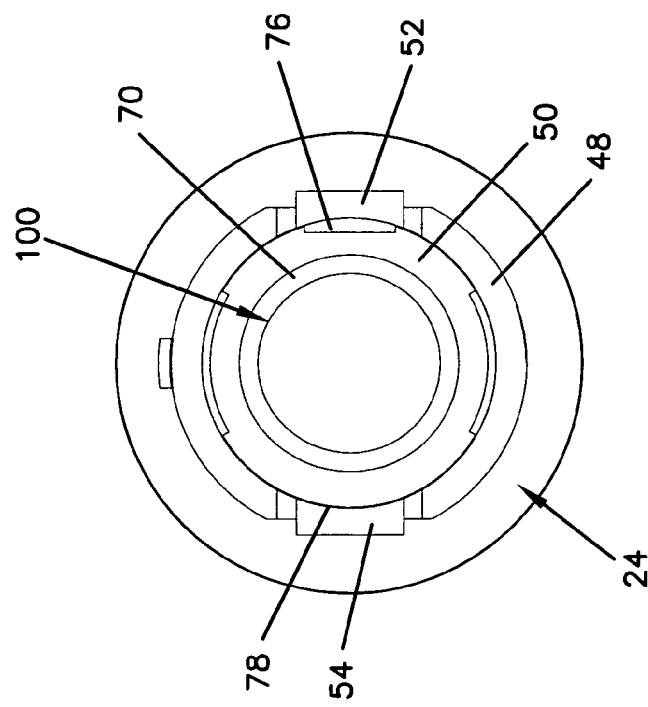
FIG. 6 is an end view of the snap sleeve of FIG. 5, with the prior art dust plug of FIG. 4 inserted.
Figure 5:
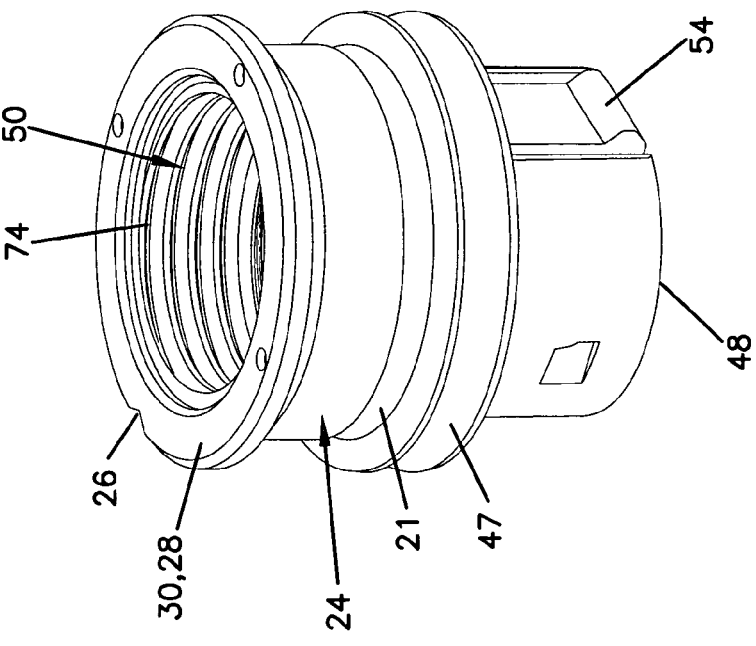
FIG. 5 is a perspective view of a snap sleeve portion of the hardened fiber optic connector of FIG. 1.

FIG. 4 illustrates a prior art dust plug 100 configured for insertion with snap sleeve 24 and includes first end 64 and threads 68. However, dust plug 100 includes a single piece body 72 with a second end 70 which is fixed to the body. FIG. 5 illustrates snap sleeve 24 with threads 74 within opening 50 adjacent first end 30. An o-ring groove 47 is about snap sleeve 24 to receive o-ring 46 and a lanyard groove 21 is about snap sleeve 24 to receive second end 22 of lanyard 18. FIG. 6 shows snap sleeve 24 with prior art dust plug 100 inserted within opening 50 and second end 70 positioned in opening 50 and adjacent fingers 52 and 54.

As can be seen in FIG. 6, finger 52 includes an inner wall 76 which includes a flat mating surface which extends further into opening 50 than a curved inner wall 78 of finger 54 on the opposite side. These different inner wall configurations provide a keying feature to properly orient the mating fiber optic plug which is part of the OptiTap connector. Such forced orientation is needed to provide an efficient optical connection within the OptiTap connector. A further benefit of the keyed engagement of the OptiTap connector is that the fiber optic plug rests close to inner walls 76 and 78 of fingers 52 and 54 of snap sleeve 24 and helps prevent inward deflection of the fingers which might disengage snap sleeve 24 from adapter housing 14.

However, as shown in FIG. 6, second end 70 of prior art dust plug 100 does not extend outwardly to closely match inner walls 76 and 78. So, while dust plug 100 is inserted within opening 50 of snap sleeve 24, snap sleeve 24 may be susceptible to unwanted disengagement from adapter housing 14. This potential lack of integrity of an OptiTap connector without a mating plug inserted may cause the OptiTap connector to fail specific tests for connectors which may be immersed in water underground and exposed to temperature extremes such as multiple freeze-thaw cycles.

Figure 7:
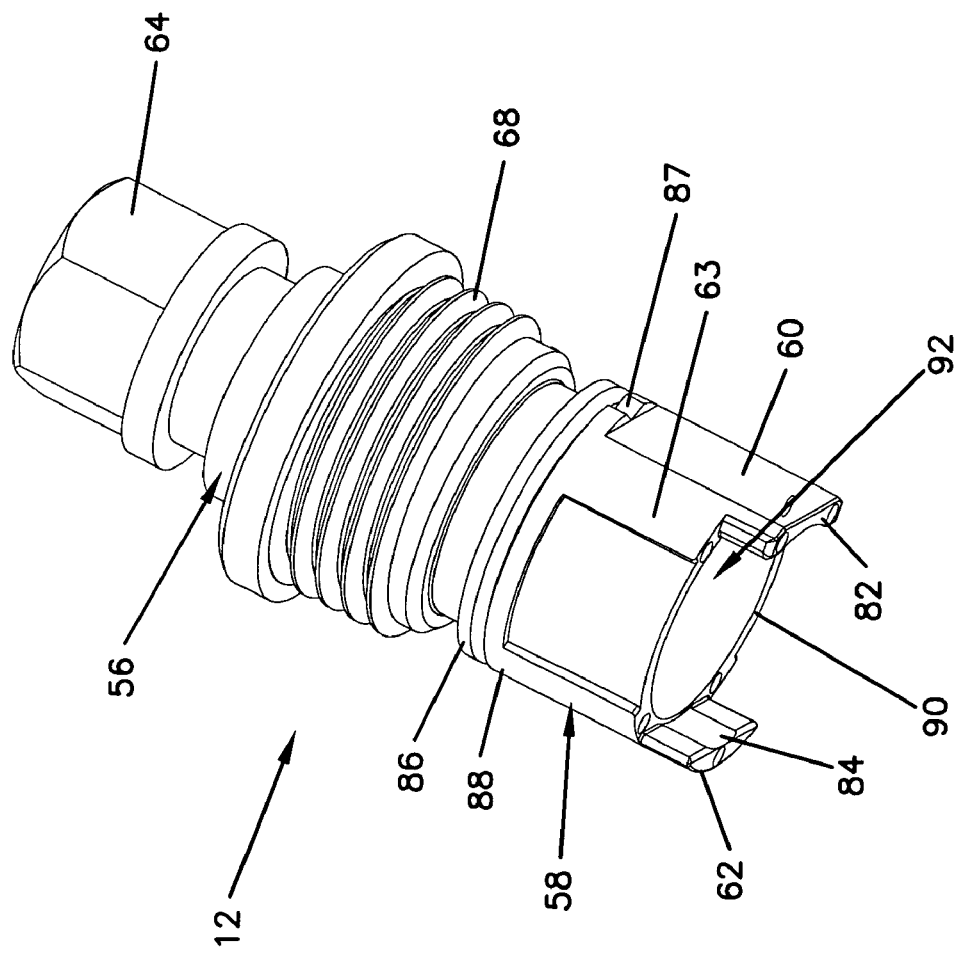
FIG. 7 is a perspective view of the dust plug according to the present invention of FIG. 1.
Figure 8:
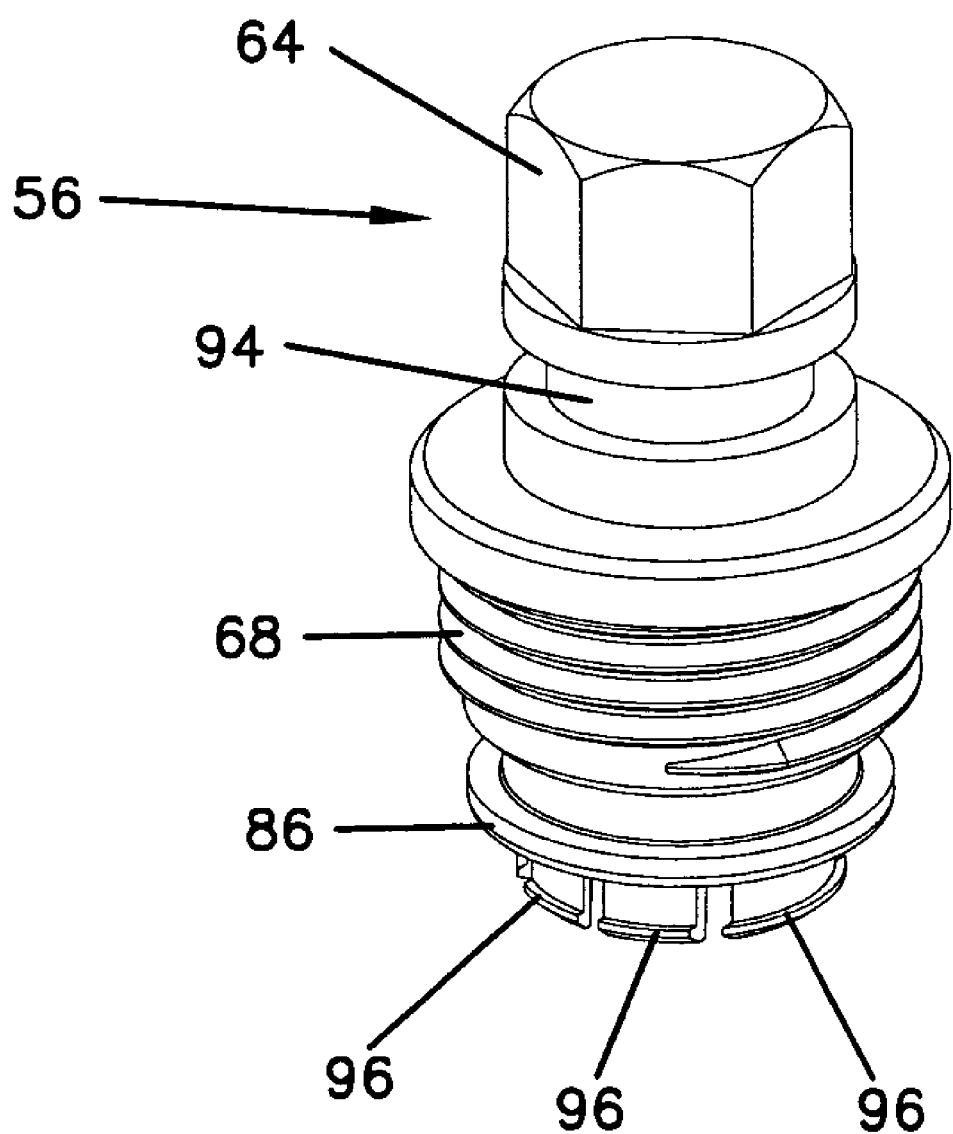
FIG. 8 is a perspective view of a threaded first portion of the dust plug of FIG. 7.
Figure 9:
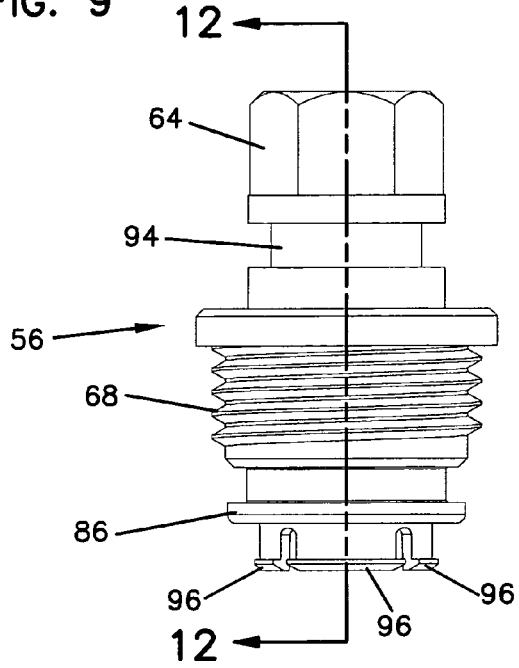
FIG. 9 is a side view of the threaded portion of the dust plug of FIG. 8.
Figure 10:
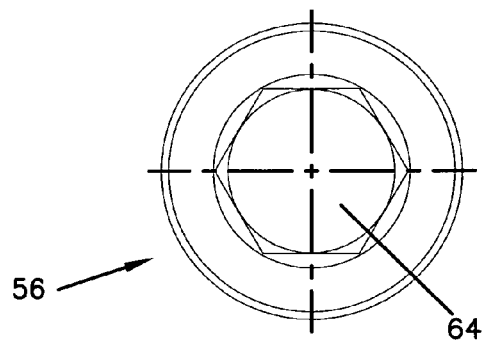
FIG. 10 is a first end view of the threaded portion of the dust plug of FIG. 8.
Figure 11:
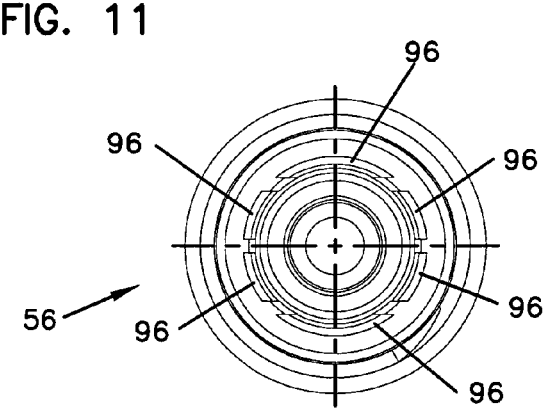
FIG. 11 is a second end view of the threaded portion of the dust plug of FIG. 8.

Referring now to FIG. 7, dust plug assembly 12 includes threaded portion 56 and keyed insert 58 rotatably attached at an second end 86 of threaded portion 56 and first end 88 of keyed insert 58. Extending from a second end 90 of keyed insert 58 is a pair of opposing tabs, first tab 82 and second tab 84. First portion 60 of outer surface 63 of keyed insert 58 extends along an outer wall of first tab 82 and second portion 62 extends along an outer wall of second tab 84. A rotational orientation indicator notch 87 is included adjacent first end 88 of keyed insert 58. Indicator notch 26 of snap sleeve 24 and indicator notch 87 of keyed insert 58 are preferably arranged so that alignment of the notches will permit insertion of keyed insert within opening 50 of snap sleeve 24.

Figure 12:
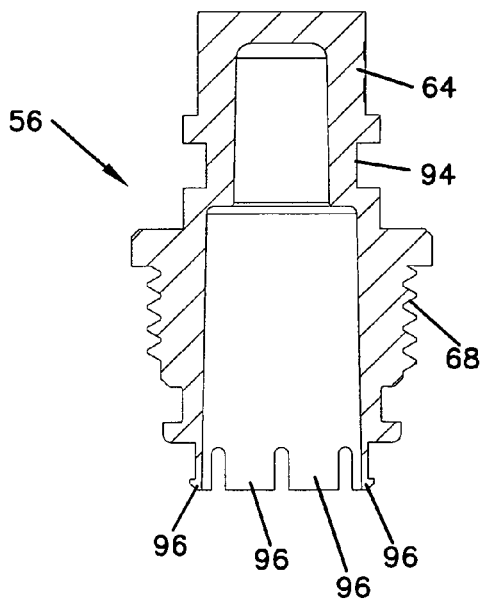
FIG. 12 is a side cross-sectional view of the threaded portion of the dust plug of FIG. 8, taken along line 12-12.

FIGS. 8 to 12 illustrate threaded portion 56 of plug assembly 12. Positioned between threads 68 and first end 64 is a recess 94 for mounting first end 20 of lanyard 18 or a similar flexible retainer arrangement. Extending from second end 86 are a plurality of retainer arms 96 which engage an inner wall of keyed insert 58 and permit rotationally independent movement of threaded portion 56 and keyed insert 58. While retainer arms 96 are shown as circular portions, other arrangements or rotational retainer mechanisms may be used within the scope of the present invention, provided these arrangements or mechanisms permit independent rotation of the two portions of dust plug 12. As can be seen in FIG. 12, threaded portion 56 is closed ended, such that when dust plug assembly 12 is inserted within snap sleeve 24, access to any adapter enclosed and retained by snap sleeve 24 is prevented. This differs from the mating connector plug of the OptiTap connector in that the mating connector plug has at least one optical fiber extending through it to adapter 42.

Figure 13:
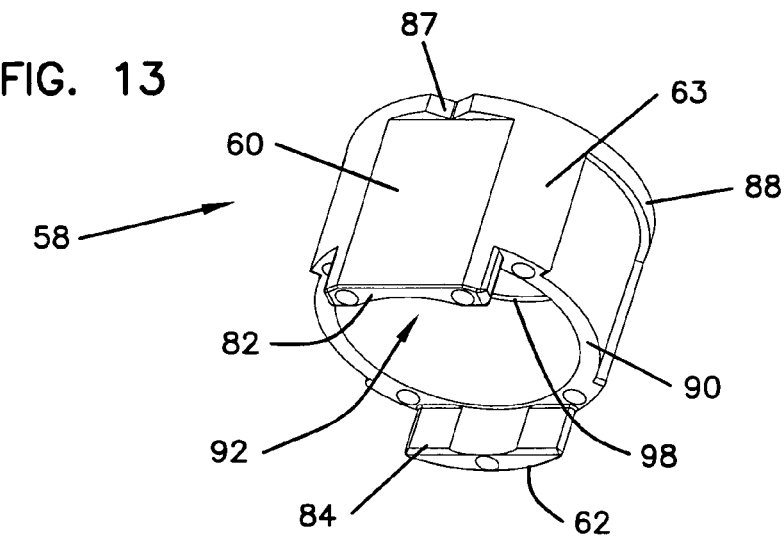
FIG. 13 is a perspective view of a keyed second portion of the dust plug of FIG. 7.
Figure 14:
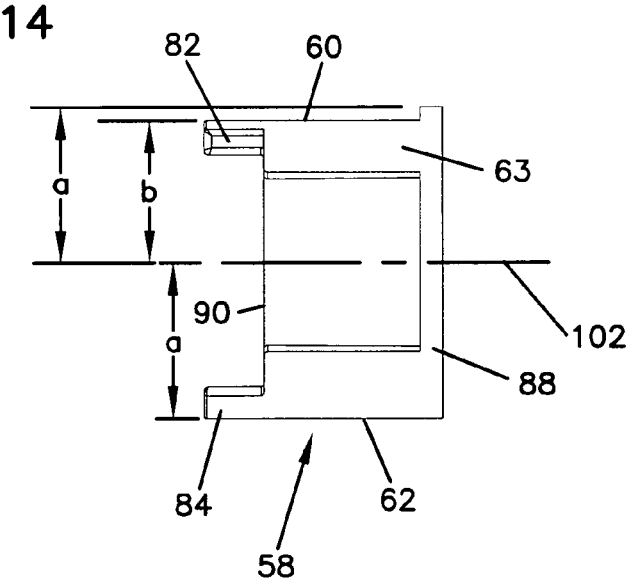
FIG. 14 is a side view of the keyed portion of FIG. 13.
Figure 15:
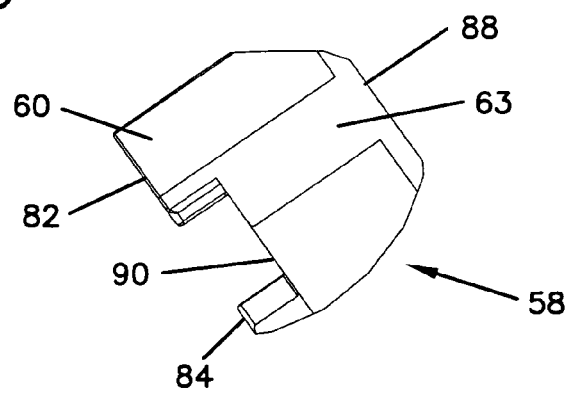
FIG. 15 is a closer perspective view of the keyed portion of FIG. 13.

FIGS. 13 to 15 show keyed insert 56 and the relationship of first and second portions 60 and 62 of outer wall or surface 63. Within a central opening 92 of keyed insert 58 is a circumferential ledge 98 which engages arms 96 of threaded portion 56. As can be seen in FIG. 14, first portion 60 of outer surface 63 may be a flat which defines a recessed portion of outer surface 63. This recessed surface, when viewed from the side, is offset from the centerline 102 of opening 92 by a distance "b". Second portion 60 and at least some of the remainder of outer surface 63 are offset from centerline 102 a greater distance "a".

Figure 17:
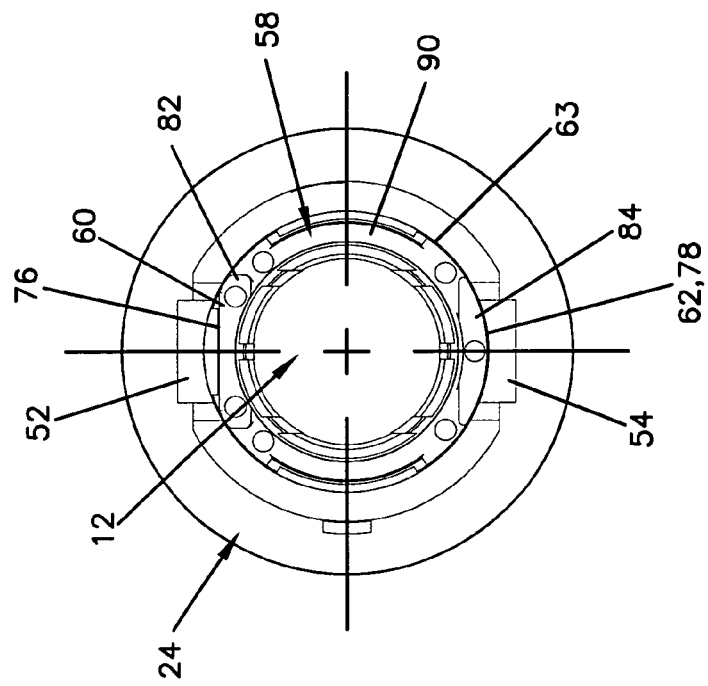
FIG. 17 is an end view of the snap sleeve and dust plug of FIG. 16.
Figure 16:
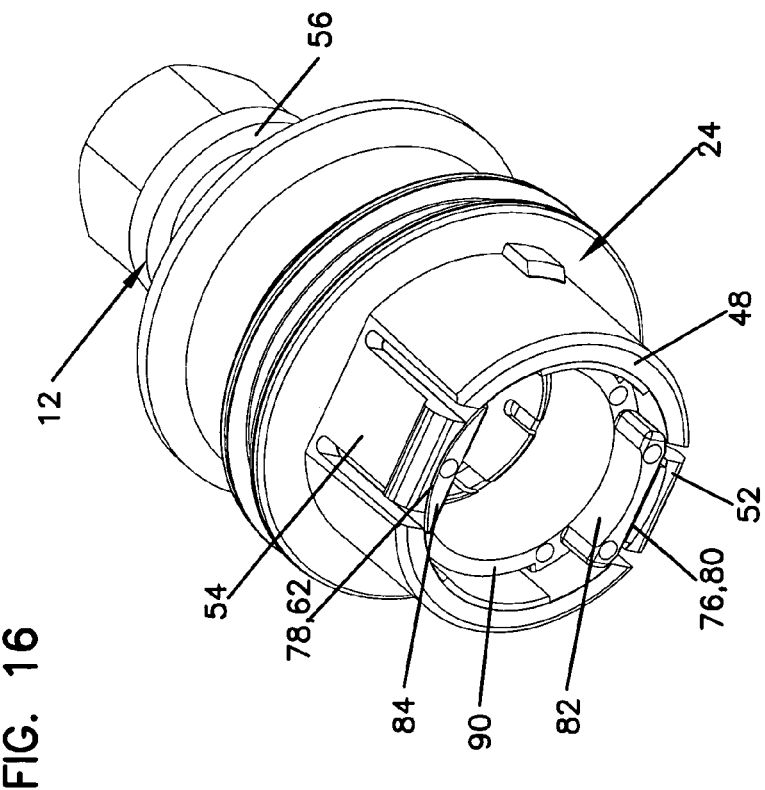
FIG. 16 is a perspective view of the snap sleeve of FIG. 5 with the dust plug of FIG. 7 inserted.
Figure 17A:
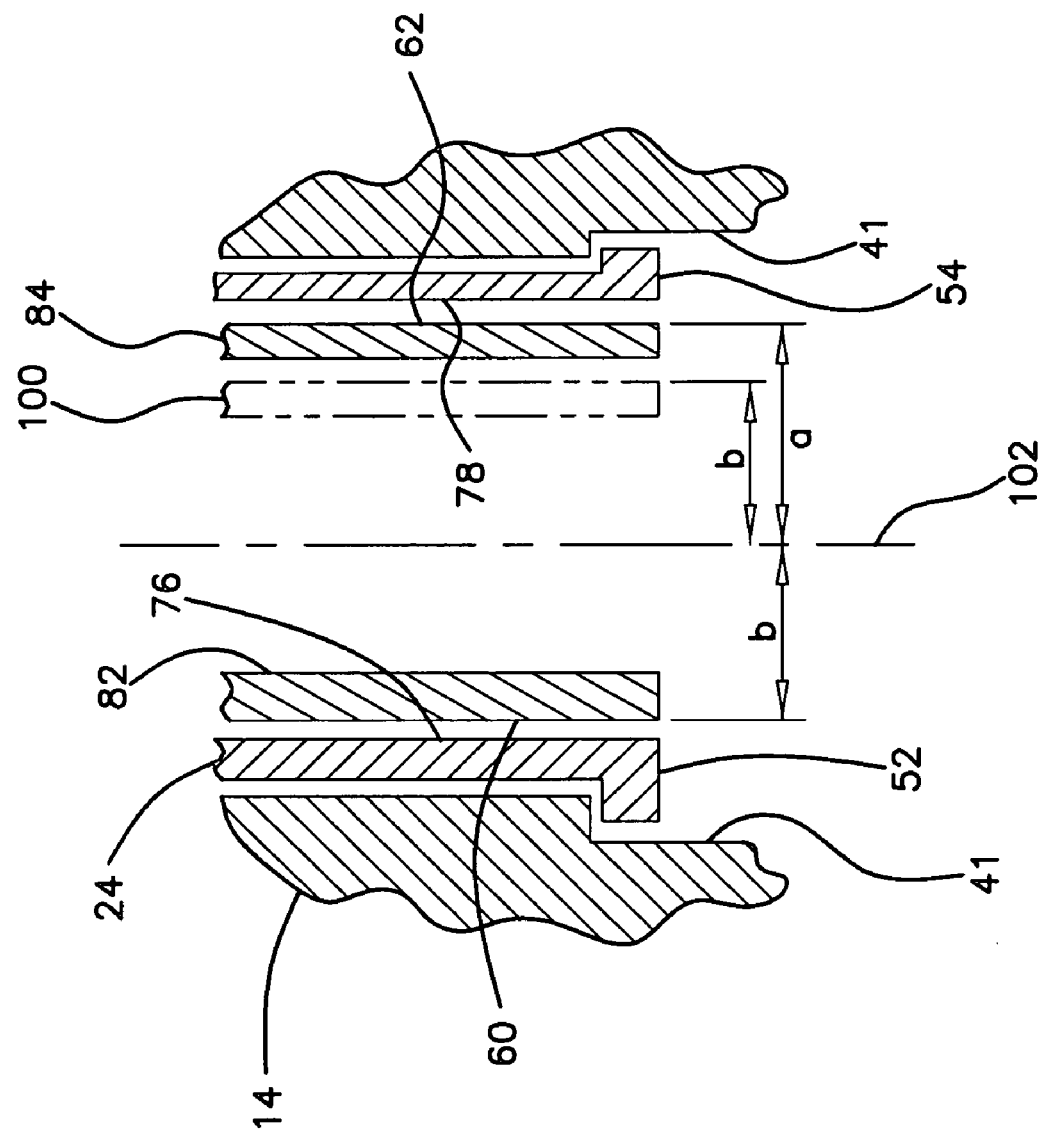
FIG. 17A is a schematic side view of FIG. 17, showing the parts inserted into an adapter housing.

Referring now to FIGS. 16 and 17, when dust plug assembly 12 is inserted within snap sleeve 24, tabs 82 and 84 of keyed insert 58 extend to adjacent second end 48 of snap sleeve 24 and are positioned directly adjacent inner walls 76 and 78 of fingers 52 and 54, respectively. Outer surfaces 60 and 62 are closely positioned adjacent inner walls or surfaces 76 and 78 and provide support against undesired inward deflection of fingers 52 and 54. Because of the inward positioning of inner wall 76 with respect to centerline 102, a dust cap that rotates within opening 50, such as prior art dust cap 100, cannot be closely positioned with respect to both inner walls 76 and 78, as shown in FIG. 6. Inner wall 76 would require a smaller diameter, close to "b," that would not rest closely against inner wall 78. Such an arrangement, as shown in FIG. 6, does not provide additional support to fingers 52 and 54 and thereby does not provide additional security against environmental or accidental intrusions. FIG. 17A shows these features in a schematic representation of tabs 82, 84 maintaining fingers 52, 54 in the retaining positions. FIG. 17A also shows the gap that plug 100 would create in the same snap sleeve 24, whereby finger 54 may not be as securely retained, allowing sleeve 24 to be separated from inner wall 41.

FIG. 18 illustrates a fiber access terminal 110 with a plurality of prior art OptiTap connectors 112 mounted and one of the connectors 112 exploded.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A dust plug assembly for a hardened fiber optic connector, the assembly comprising:
   a threaded cap including a first end and a second opposite end and a threaded portion between the first and second ends, the first end shaped to provide a gripping surface for rotating the threaded cap;
   a keyed insert rotatably mounted to the threaded cap adjacent the second end of the threaded cap, the insert including a first end mounted to the threaded cap and a second end defining a mating end for insertion into the hardened fiber optic connector, the mating end of the keyed insert including a pair of tabs extending from the second end;
   the mating end of the keyed insert further including a generally cylindrical cross-section defining an axis, with a recessed flat parallel to the axis on a first side extending along an outer surface of one of the tabs across the second end of the insert toward the first end of the insert, and a rounded surface opposite the flat extending along an outer surface of the other tab across the second end of the insert toward the first end of the insert, the flat positioned closer to the axis than the rounded surface.

2. The dust plug assembly of claim 1, wherein the first end of the threaded cap has a hexagonal exterior.

3. The dust plug assembly of claim 1, the mating end further comprising a visual indicator denoting the location of the flat.

4. The dust plug assembly of claim 1, further comprising a lanyard having a first end rotatably attached to the threaded cap between the first end and the threaded portion of the threaded cap, and a second end configured to be rotatably mounted to the hardened fiber optic connector.

5. An assembly of a hardened fiber optic connector, the assembly comprising:
   an adapter housing, a snap sleeve to secure an adapter within the opening of the adapter housing, and a dust plug;
   the adapter housing configured to receive the adapter and including an opening with an inner surface;
   the snap sleeve including a first end for insertion into the adapter housing, a second end for receiving a mating hardened fiber optic connector, and defining an axial opening between the first and second ends, the first end of the snap sleeve including a plurality of fingers extending generally parallel with the axis of the opening, each finger having an inner surface and an outer surface, the snap sleeve further including a threaded second end opposite the first end, the second end configured to receive the dust plug;
   the outer surface of each finger of the snap sleeve including an outwardly extending tab which engages the inner surface of the opening of the adapter housing and which may be disengaged by deflecting the finger inwardly, the inner surface of at least one of the fingers inset at a different distance from the axis of the opening of the snap sleeve;
   the dust plug including a threaded portion rotatably attached to a keyed insert, the keyed insert including an outer surface which engages the inner surfaces of the fingers and prevents the fingers being deflected inwardly and disengaged from the inner surface of the opening of the adapter housing, the outer surface of the keyed insert including a recessed portion;
   wherein the outer surface of the keyed insert is configured so that the keyed insert can only be inserted within the opening of the snap sleeve with the recessed portion adjacent the inner surface of the inset finger.

6. The assembly of claim 5, wherein the threaded portion has a hexagonal exterior end.

7. The assembly of claim 5, wherein the keyed insert includes a visual indicator denoting the location of the recessed portion.

8. The assembly of claim 5, further comprising a lanyard having a first end rotatably attached to the dust plug, and a second end rotatably mounted to the snap sleeve.

9. A method of assembly of a hardened fiber optic connector comprising:
   providing an adapter housing configured to receive a fiber optic adapter and including an opening with an inner surface;
   providing a snap sleeve including a first end for insertion into the adapter housing, a second end for receiving a mating hardened fiber optic connector, and defining an axially opening between the first and second ends, the first end of the snap sleeve including a plurality of fingers extending generally parallel with the axis of the opening, each tab having an inner surface and an outer surface, the snap sleeve further including a threaded second end opposite the first end, the second end configured to receive a dust plug, the outer surface of each finger of the snap sleeve including an outwardly extending tab which engages the inner surface of the opening of the adapter housing and which may disengaged by deflecting the finger inwardly, the inner surface of at least one of the fingers inset at a different distance from the axis of the opening of the snap sleeve;

longitudinally inserting a keyed insert of a dust plug into the opening of the adapter housing, wherein the keyed insert includes an outer surface which engages the inner surfaces of the fingers and prevents the fingers from being deflected inwardly and disengaged from the inner surface of the opening of the adapter housing, the outer surface of the keyed insert including a recessed portion, wherein the outer surface of the keyed insert is configured so that the keyed insert can only be inserted within the opening of the snap sleeve with the recessed portion adjacent the inner surface of the inset finger;

while the keyed insert is positioned into the opening, threading a portion of the dust plug into mating engagement with a threaded portion of the snap sleeve.

* * * * *